United States Patent
Magnanini

(10) Patent No.: US 8,440,076 B2
(45) Date of Patent: May 14, 2013

(54) DISSOLVED AIR FLOTATION UNIT

(75) Inventor: Giovanni Magnanini, Reggio Emilia (IT)

(73) Assignee: Acqua & Co. S.R.L., Cadelbosco di Sopra (IT)

( * ) Notice: Subject to any disclaimer, the term of this patent is extended or adjusted under 35 U.S.C. 154(b) by 759 days.

(21) Appl. No.: 12/596,273

(22) PCT Filed: Feb. 20, 2008

(86) PCT No.: PCT/IB2008/000470
§ 371 (c)(1),
(2), (4) Date: Oct. 16, 2009

(87) PCT Pub. No.: WO2008/129371
PCT Pub. Date: Oct. 30, 2008

(65) Prior Publication Data
US 2010/0108584 A1 May 6, 2010

(30) Foreign Application Priority Data

Apr. 20, 2007 (IT) .............................. RE2007A0056

(51) Int. Cl.
*C02F 1/24* (2006.01)
(52) U.S. Cl.
USPC .................................... 210/221.1; 210/221.2
(58) Field of Classification Search ............... 210/221.1, 210/221.2
See application file for complete search history.

(56) References Cited

U.S. PATENT DOCUMENTS

| 1,219,089 | A | * | 3/1917 | Dunn | 209/166 |
| 3,794,171 | A | | 2/1974 | Kimura et al. | |
| 4,330,403 | A | * | 5/1982 | Fuchs | 210/221.2 |
| 4,551,246 | A | * | 11/1985 | Coffing | 210/221.2 |
| 5,954,955 | A | * | 9/1999 | Mori et al. | 210/221.2 |
| 2001/0032812 | A1 | * | 10/2001 | Morse et al. | 210/257.1 |

FOREIGN PATENT DOCUMENTS

| EP | 0 562 314 A1 | 9/1993 |
| GB | 470 315 A | 8/1937 |

(Continued)

OTHER PUBLICATIONS

Ross Charles C. et al., "Recent Advances and Applications of Dissolved Air Flotation for Industrial Pretreatment", North Carolina AWWA/WEA Conference, [Online] Nov. 17, 2003, pp. 1-10, XP002483887, USA, North Carolina, Retrieved from the Internet: URL:http://www.etsenvironmental.com/pdf/recentadvancesandapplicationsofETS.pdf> [retrieved on Jun. 10, 2006].

*Primary Examiner* — Thomas M Lithgow
(74) *Attorney, Agent, or Firm* — Pearne & Gordon LLP

(57) ABSTRACT

A water treatment unit comprising a bath (2) delimited by a bottom wall (3) and a lateral wall (4) developing in elevation from a whole perimeter of the bottom wall (3), means for supplying (14) the water to be treated into the bath (2), at least an aeration device (5) have dissolving functions in collaboration with the means for supplying (14), for introducing a flow of oxygen or ozone into the water contained in the bath (2) in order to saturate the water and/or to give rise to foam, means for eliminating (6) the foam, at least an outlet section (13) of the treated water from the bath (2). The bath (2) develops prevalently horizontally and internally comprises a dividing wall (7) which divides the internal volume of the bath (2) into a turbulent water zone (2a) and a calm water zone (2b).

16 Claims, 3 Drawing Sheets

FOREIGN PATENT DOCUMENTS

| | | | | |
|---|---|---|---|---|
| GB | 1 388 469 A | | | 3/1975 |
| GB | 2279946 A | * | | 1/1995 |
| GB | 2412333 A | * | | 9/2005 |
| JP | 06-057669 A | * | | 3/1994 |
| JP | 07-145585 A | * | | 6/1995 |
| JP | 2006-055814 A | * | | 2/2006 |
| WO | WO 93/20945 A1 | * | | 10/1993 |
| WO | 01/51164 A1 | | | 7/2001 |

* cited by examiner

DISSOLVED AIR FLOTATION UNIT

TECHNICAL FIELD

The invention relates to a water treatment unit.

BACKGROUND ART

As is known, waste of water resources and the contemporary elimination of polluting substances are problems very much at the forefront of concern in recent years.

In particular, these problems especially relate to plants using considerable quantities of water for cleaning apparatus or machinery or for animal husbandry or plants or for treatment of food substances. In all these cases the water, after having been used, may contain detergents, organic substances or polluting products which make it difficult to eliminate.

In other cases, according to the point of water collection and according to the use destination of the collected water, the water has to be improved before being sent on to further operations.

A partial solution to the above problems relates to the use of special units for is water treatment.

The water is oxygenated, cleaned and separated from the substances dispersed therein, such as to be enriched and re-used in the best way. At the same time, or independently, with this treatment the materials to be eliminated can be collected and eliminated in ways most suitable for their treatment.

More specifically, such a device is particularly suited to being used in the fish industry, in the sector of crustacean cultivation, or fish-farming or aquaria management.

The fish or crustaceans contain or produce organic substances or small particles of waste materials which contaminate or cloud up the water they are in, making the water impure.

The water must be oxygenated and cleaned in order to maintain the well-being of the organisms contained therein. For this purpose techniques of saturation and flotation are applied.

Saturation is a process which concentrates a determined gas in the water, such as, for example, oxygen.

Flotation is a process which removes from the water the organic substances or small suspended waste particles, exploiting the coagulation of these substances about air bubbles caused artificially in the water. In other words, the organic substances and more generally surfactant substances dispersed in the water exhibit molecules having a polar end (and therefore hydrophilic) and a dipolar end (and therefore hydrophobic).

The bubbles rise to the surface, attracting the dipolar end of the molecule with the polar part facing towards the water. When the bubbles reach the free surface of the water, the particles attached to the surface of the bubble prevent it from exploding. The aggregation of many bubbles forms a foam to be eliminated.

The water treatment units at present available, commonly also known as oxygen saturators or de-foaming devices, are constituted by a column container, and thus have a prevalently vertical development, internally of which the water removed from the raising tanks and storage tanks or aquaria is made to flow in order to be oxygenated, cleaned and re-used.

The column container is surmounted by a chamber internally of which the foam to be removed is collected. The lower part of the container and the upper chamber are connected by means of a conduit shaped as an upturned funnel, the larger section of which is connected to the upper end of the container, and the neck of which, facing upwards, stretches to inside the foam-collecting chamber.

A flow of air is allowed into the container from below, using pumps connected to a venturi tube or with the aid of porous stones, while the water to be cleaned is run into the container from above; in this way the descending motion of the water, combined with the ascending flow of air, creates a recycling of water which produces turbulence. During the raising, the air bubble adsorb the waste substances, accumulating on the free surface in the container in the form of a foam. The foam rises along the upturned-funnel conduit and falls inside the collection chamber, in which is it liquefied by the use of water jets and is finally conveyed to the outside through special discharge conduits.

These devices, apart from generating considerable waste of water, used for is example for the liquefaction of the foam, are also considerably large and require considerable power to run the water treatment unit.

Also, these devices have poor operative flexibility, as they are designed limitedly for a range of containers of different sizes, each using a power unit dedicated to the water volume contained in the respective container.

Further, the water flow rate which the devices are able to treat is proportional to the size thereof.

The aim of the present invention is to provide a water treatment unit of contained dimensions.

A further aim of the present invention is to provide a water treatment unit which enables considerable volumes of water to be treated with low power consumption.

A further aim of the present invention is to realise a water treatment unit which can be used with water basins of various sizes, and which thus enables varying quantities of water volume to be treated.

The set technical task and the specified aims are substantially attained by a water treatment unit comprising one or more of the technical solutions claimed in the appended claims.

DISCLOSURE OF INVENTION

A description will now be made, by way of non-limiting example, of a preferred but not exclusive embodiment of a water treatment unit, illustrated in the accompanying figures of the drawings, in which.

Figure 1:
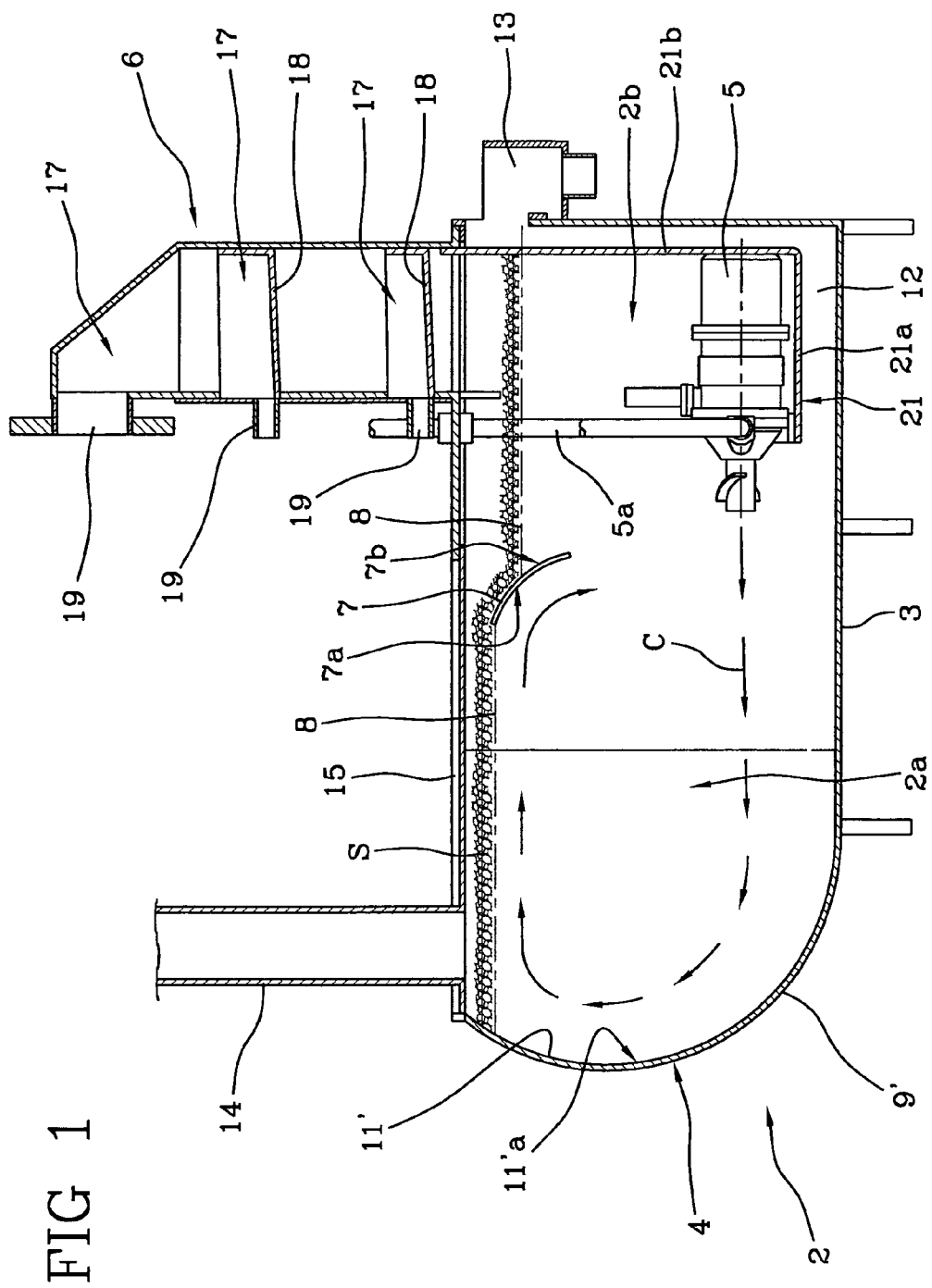
FIG. 1 is a sectioned lateral view of a first embodiment of a water treatment unit having the functions of dissolving oxygen for saturation-treating the water.

With reference to the figures of the drawings, 1 denotes in its entirety the water treatment unit of the present invention.

The unit comprises a bath 2 delimited by a bottom wall 3 and a lateral wall 4 developing in elevation around the entire perimeter of the bottom wall 3. The bath 2 develops prevalently in the horizontal direction and preferably exhibits a parallelepiped conformation.

The bath 2 internally exhibits at least an aeration device 5 for injecting a flow of air or oxygen or ozone or another gas internally of the water contained in the bath 2.

The aeration device 5, of substantially known type and described in the European patent owned by the Applicant, no. EP0562314, exhibits the double function of air/gas aspirator and injector and can be connected, according to the treatment to be carried out, to an oxygen or pure ozone source, not illustrated in the figures of the drawings.

The aeration device 5 is preferably located on the bottom wall 3 of the bath 2 and communicating with the outside of the bath 2 via conduits 5a, for removing air, oxygen or ozone.

The conduits 5a, if rigid, can further facilitate suspended mounting of the aeration device 5 instead of placing them resting on the bottom wall 3 of the bath 2.

The flow rate of the air, oxygen or zone introduced into the water contained in the bath 2 can be varied by using the regulation valves, as can the degree of turbulence thereof.

The water treatment unit 1 further comprises means 6 for eliminating foam.

A dividing wall 7 located internally of the bath 2 divides the internal volume of the bath 2 into a zone with turbulent water 2a and a zone with calm water 2b. The dividing wall 7 is positioned at the free surface 8 of the water for conveying and confining the foam S which is produced on the surface of the water, more precisely on the free surface of the zone of calm water before removal thereof from the bath 2.

In a first embodiment illustrated in FIG. 1, a portion of the lateral wall 4, opposite the aerating device 5, is delimited by a first wall 9' defined by a curved portion 11' exhibiting concavities 11a', developing in continuity and in elevation from the bottom wall 3 and passing through the free surface 8 of the water contained in the bath 2.

An L-shaped second wall 2 is located opposite the first wall 9', internally of the bath 2; the second wall 2 exhibits a substantially horizontal first tract 21a, parallel to the bottom wall 3 and located below the aeration device 5, and a substantially vertical second tract 21b, equal in length to the lateral wall 4 and located by the side of the aerating device 5 opposite the air delivery.

The aeration device 5, preferably located on the bottom wall 3 of the bath 2, advantageously faces the concavity 11a' of the curved portion 11', such that the air flow exiting the aeration device 5, by impacting against the curved portion 11, creates a forced recycling of water internally of the turbulent water zone 2a.

In particular, the aeration device 5 is located in the calm water zone 2b, at the first tract 21a of the second wall 21; in this way the exiting air flow from the aeration device 5 runs up the first wall 9' and follows the whole profile thereof, initially performing a substantially horizontal and straight course and then describing a curved course, deviated upwards by the geometry of the curved portion 11'.

Thus a circulation of the water C is created, in a clockwise direction in relation to FIG. 1, in a prevalently horizontal direction.

The dividing wall 7 exhibits in section a curved profile having a concavity 7a facing towards the concavity 11a' of the curved portion 11' of the first wall 9'. The concavities 7a and 11a' respectively of the wall 7 and the curved portion 11' delimit, on opposite sides, the zone of turbulent water 2a internally of which the forced recycling of water activated by the aeration device 5 is done.

The particular position and geometry of the dividing wall 7 enables the foam S accumulated on the free surface of the turbulent water zone 2a to surmount the dividing wall 7, to slide along the convexity of the wall 7 and to be conveyed towards the calm water zone 2b.

The concavity 7a of the dividing wall 7 have to face towards the turbulent water zone 2a, internally of which the forced recycling of the water promotes the descent of the treated water flow, i.e. the water without the foam, towards the bottom wall 3 of the bath 2.

The second wall 21, with the bottom wall 3 of the bath 2, defines an outlet path 12 internally of which the treated water 7 deviated by the dividing wall 7 is channeled. The path 12 communicates with an outlet section 13 from which the water with the organic substances and impurities removed is re-introduced into the raising baths or aquaria.

The path 12 can also be realised by arrangement of a tube or battery of tubes, not shown in the accompanying figures of the drawings.

The path 12 through which the clean and oxygenated water runs is separated from the zone of turbulent water 2a by the second wall 21.

The water treatment unit 1 further comprises means for supplying 14 via which the water to be treated is introduced into the bath 2. As illustrated in FIG. 1, these means for supplying 14 can be constituted by a column conduit, preferably crossing the upper edge 15 of the bath 2 and being located opposite the installation position of the aeration device 5, to facilitate a gas dissolving process, preferably of oxygen, in the water.

Figure 2:
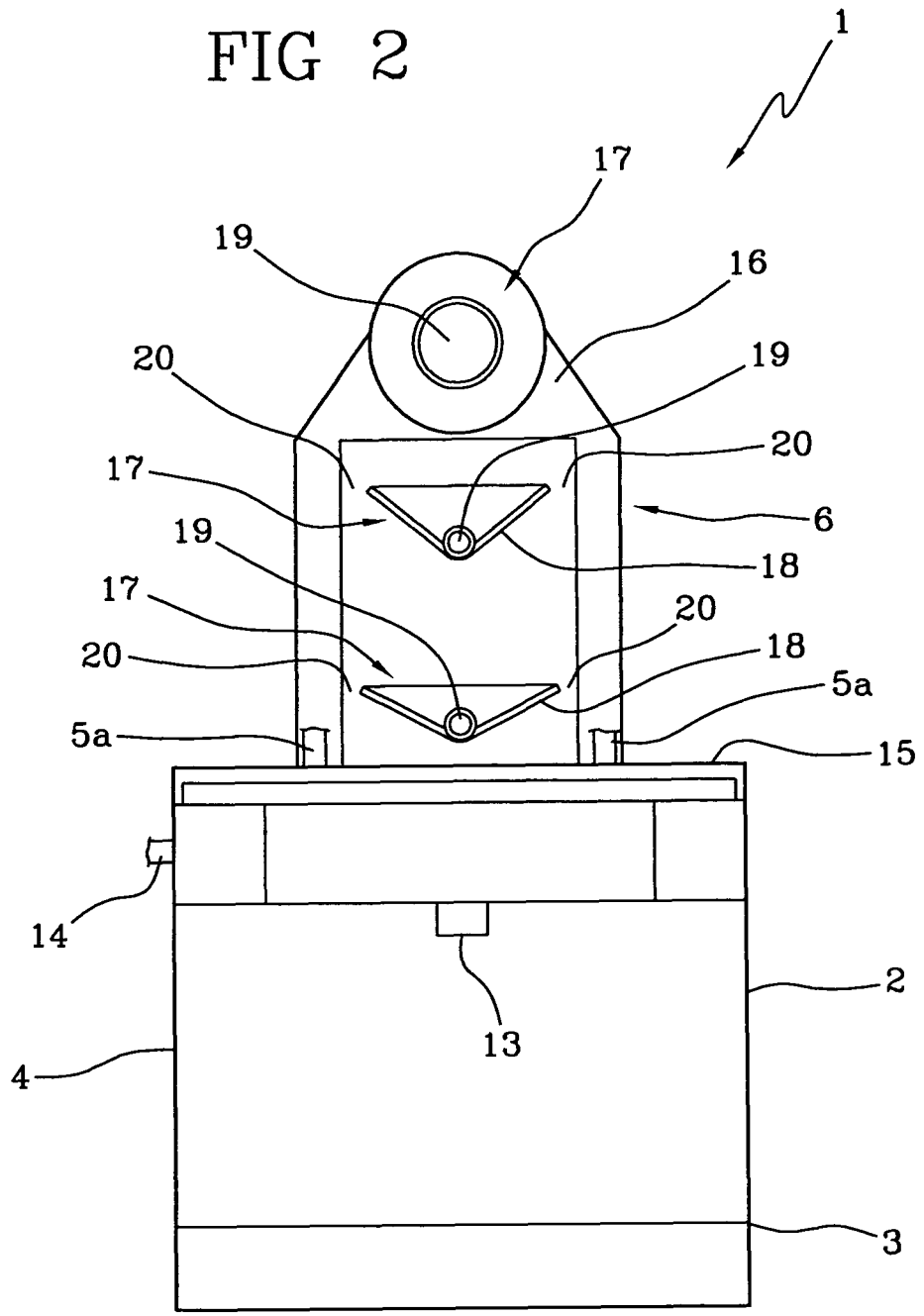
FIG. 2 is a front view of a second embodiment of the water treatment unit of the present invention.
Figure 3:
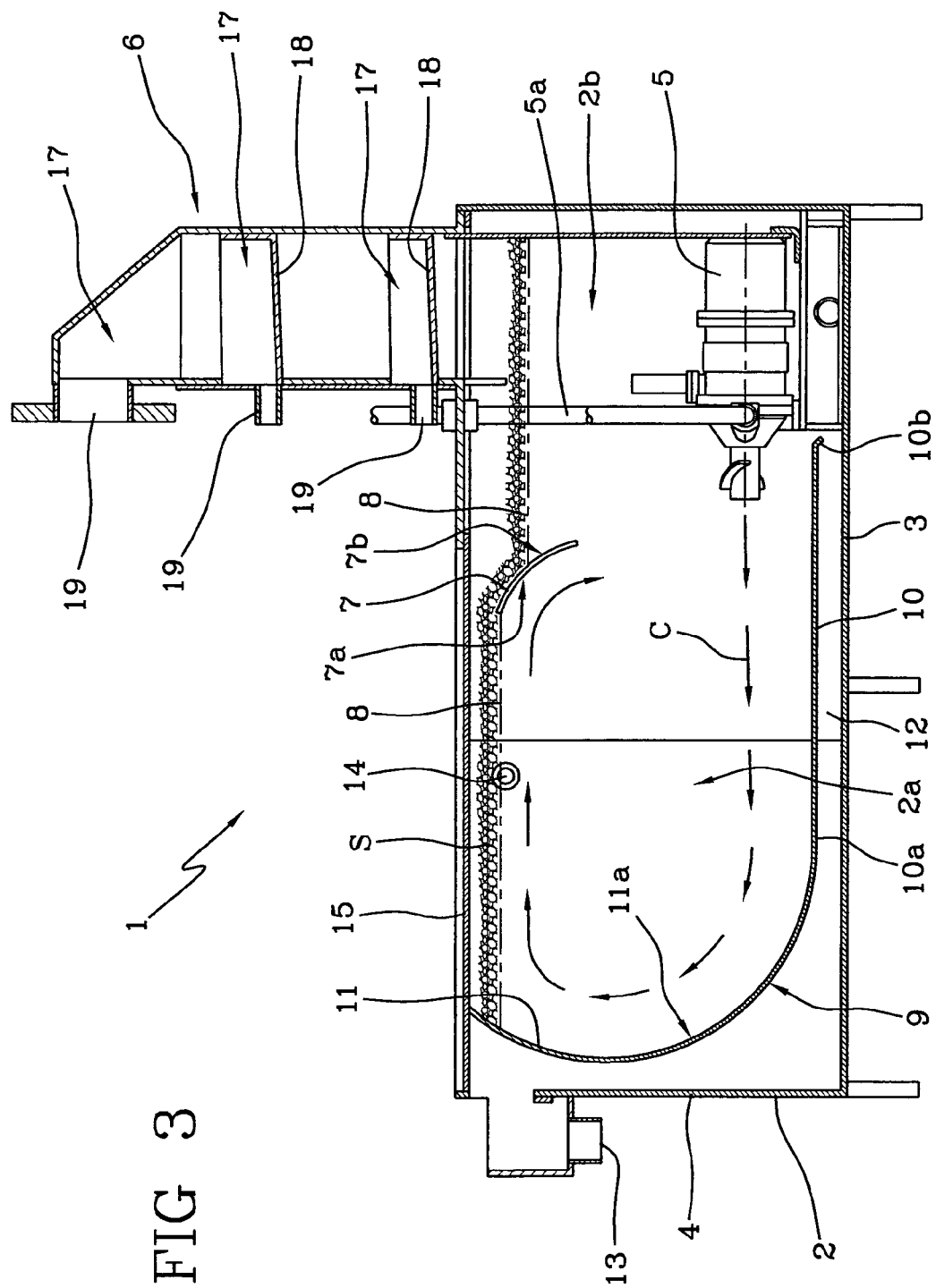
FIG. 3 is a sectioned lateral view of the water treatment unit illustrated in FIG. 2, having defoaming functions for performing the flotation treatment of the water.

In a second embodiment illustrated in FIGS. 2 and 3, the bath 2 further comprises a first wall 9 comprising a straight portion 10 which is parallel to the bottom wall 3, and a curved portion 11, developing continuously and in elevation from a first end 10a of the straight portion 10, up until it surmounts the free surface 8 of the water contained internally of the bath 2, as illustrated in FIG. 3.

The aeration device 5, located on the bottom wall 3 of the bath 2, advantageously faces the concavities 11a of the curved portion 11, such that as the flow of air exiting the aeration device 5 impacts against the curved portion 11, it creates a forced recycling of the water internally of the turbulent water zone 2a.

In particular, the aeration device 5 is located in the calm water zone 2b, at a second end 10b of the straight portion 10; in this way the flow of air exiting the aeration device 5 flows above the first wall 9 and follows the whole profile thereof, initially following a substantially horizontal straight trajectory, guided by the geometry of the straight portion 10, then describing a curved path, deviated upwards by the geometry of the curved portion 11.

Thus a circulation C of the water is created in a clockwise direction with reference to FIG. 3, in a prevalently horizontal direction.

The dividing wall 7 exhibits in section a curved profile with a concavity 7a is facing towards the concavity 11a of the curved portion 11 of the first wall 9. The concavities 7a and 11a respectively of the dividing wall 7 and the curved portion 11 delimit, on opposite sides, the turbulent water zone 2a internally of which the forced recycling of the water activated by the aeration device 5 occurs.

The particular position and geometry of the dividing wall 7 enable a longer water—air/gas contact time and give more time for the foam S which accumulates on the free surface 8 of the turbulent water zone 2a to surmount the dividing wall 7, slide along the convexity 7b of the wall 7 and be conveyed towards the calm water zone 2b.

The concavity 7a of the dividing wall 7, on the other hand, being turned towards the turbulent water zone 2a internally of which the forced water recycling is done, promotes the descent of the treated water flow which is saturated with oxygen and without the foam towards the bottom wall 3 of the bath 2.

The straight portion 10 of the first wall 9 defines, with the bottom wall 3 of the bath 2, an outlet trajectory 12 internally of which the treated water deviated by the dividing wall 7 is conveyed. The trajectory 12 communicates with an outlet section 13 from which the saturated water with the organic substances and impurities removed is re-introduced into the raising baths or aquaria.

The trajectory 12 can be realised via the arrangement of a tube or battery of tubes, not represented in the enclosed figures of the drawings.

The trajectory 12 through which the clean water flows is separated from the turbulent water zone 2a by the first wall 9.

The water treatment unit 1 further comprises means for supplying 14 by means of which the water to be treated is introduced into the bath 2. Typically the means for supplying 14 are constituted by an inlet conduit, similar to the one used for the treatment unit of FIG. 1 and preferably located in proximity of the upper edge 15 of the bath 2, to further increase the turbulence of the water.

The means for supplying 14 however have an outlet above the free surface of the water 8.

In a further embodiment, not illustrated, the means for supplying 14 are constituted by a column inlet, preferably located above the aeration device, located on the upper edge 15 in communication with the inside of the bath 2. The means for eliminating foam 6 are situated above the bath 2, preferably above the calm water zone 2b. The means for eliminating foam 6 preferably comprise a column 16, along which the foam S that accumulates above the calm water zone 2b rises.

At least a storage station 17 for foam accumulation and elimination is present internally of the column 16. At least a plurality of foam accumulation and elimination stations 17 is advantageously comprised, piled vertically and distanced from one another. The presence of several stations 17 is preferred as the foam exhibits zones having different densities on the basis of the quantity of water and impurities with which the air bubbles link. During the rising along the column 16, the heaviest foam deposits first on the station 17 located lowest, while the lightest foam continues to rise, pushed by the underlying foam S towards the upper stations.

Each station preferably comprises a plate 18 having concavities facing upwards, on which the foam is deposited and liquefies before being conveyed externally by a respective discharge conduit 19.

The size of the transversal section of each plate 18 is smaller than the size of the internal transversal section of the column 16, such that each plate 18 identifies, with the internal surface of the column 16, a passage hole 20 to enable the foam to rise.

In particular, each plate 18 is preferably V-shaped, and the width of the concavity can vary from one plate to another. Generally, as illustrated in FIG. 1, larger plates are located lower because they collect foam having greater density, which when it liquefies occupies a greater volume because of the high amount of impurities and water.

For constructional simplicity it is possible to insert plates all of the same size. The last station 17 for foam accumulation and elimination generally comprises only one discharge conduit 19, without any collection plate, as only the lighter foams arrive at this level, and they are directly conveyed externally with there being any need for them to stay still in order to liquefy.

The aeration device 5 can be a general pump device connected to injectors functioning on the venturi principle.

The preferred aeration device 5 advantageously comprises the use of a propeller connected to a motor. The presence of propellers, in fact, leads to obtaining a greater turbulence as well as creating smaller bubbles which facilitate saturation by greater air-gas contact and adsorption of the substances to be eliminated.

Further, the agitating motion produced by the propeller emphases the polarisation mechanism of the water molecules, and increases the dissolving capacity of the air/gas, improving the performance thereof.

The water treatment unit enables considerable quantities of water to be treated with a small use of power.

Further, though of contained size, the unit can be adapted for various-dimension basins, so it is able to work with variable flow rates according to needs.

The treatment unit advantageously provides high performance.

In a case in which the water treatment unit were to be used as an oxygen dissolver, the treatment unit enables high levels of water saturation to be used in short cycle times, exploiting at least three stages of dissolving.

The first stage happens inside the bath due to turbulence and injection.

In this stage of dissolving the oxygen injected by the aeration device fixes to the water by turbulence and water-gas contact time.

The excess oxygen operates in a second dissolving stage, localised at the free surface of the water 8, by contact and fractioning.

In this stage of dissolving, the oxygen not dissolved in the preceding stage is positioned between the free surface of the water 8 and the upper wall 15 of the bath 2, fixing to the water by effect of the fractioning of the water falling from the means for supplying 14 onto the free surface 8.

A third stage takes place internally of the means for supplying 14 and is known as counter-current dissolving.

In this final stage of dissolving, the oxygen not dissolved in the preceding two stages crosses the means for supplying 14 in counter-current direction, linking to the water.

By adopting the embodiment of FIG. 1, exhibiting the column means for supplying 14, a better performance is obtained in the counter-current dissolving stage, as the column inlet functions as a static aerator.

Finally, the water treatment unit exhibits high operating flexibility.

Should the water treatment unit be used as an oxygen dissolver, this can be obtained with the embodiment of FIG. 1 without revolutionising the technical design of the machine.

In a case in which, for economic reasons connected to the costs of oxygen or pure ozone, a configuration of the water treatment unit 1 were preferred as illustrated in the embodiment of FIG. 3, the machine would have the function of a de-foamer and in part a dissolver, exploiting the quantity of oxygen present in the air.

The invention claimed is:

1. A water treatment unit comprising a bath (2) delimited by a bottom wall (3) and a lateral wall (4) developing in elevation from a whole perimeter of the bottom wall (3), means for supplying (14) the water to be treated into the bath (2), at least an aeration device (5) for introducing a flow of oxygen or ozone into the water contained in the bath (2) in order to saturate the water and/or to give rise to foam, means for eliminating (6) the foam, at least an outlet section (13) of the treated water from the bath (2), said bath (2) developing prevalently horizontally and internally comprises a dividing wall (7) which divides an internal volume of the bath (2) into a turbulent water zone (2a) and a calm water zone (2b), characterized in that the bath (2) comprises internally at least a first internal wall (9) comprising a curved portion (11, 11') developing in elevation from the bottom wall (3) up to beyond a free surface of the water (8), wherein the first wall (9) comprises a straight portion (10), parallel to the bottom wall (3) developing continuously from the curved portion (11) and exhibiting a first end (10a) connected to the curved portion (11), wherein said unit comprises an L-shaped second wall (21), exhibiting a first tract (21a) parallel to the bottom wall (3) and a second tract (21b) continuous to the first tract (21a) and having a same development as the lateral wall (4), wherein the aeration device (5) is located in the calm water zone (2b), above the first tract (21a) of the second wall (21), such that the air flow exiting from the aeration device (5) runs parallel to the bottom wall (3) before being deviated upwards by a concavity (11a') of the curved portion (11') of the first wall (9).

2. The unit of claim 1, characterised in that the bath (2) comprises at least a first wall (9) comprising a curved portion (11, 11') developing in elevation from the bottom wall (3) up to beyond a free surface of the water (8) contained internally of the bath (2).

3. The unit of claim 2, characterised in that the first wall (9) comprises a straight portion (10), parallel to the bottom wall (3), developing continuously from the curved portion (11) and exhibiting a first end (10a) connected to the curved portion (11).

4. The unit of claim 2, characterised in that it comprises an L-shaped second wall (21), exhibiting a first tract (21a) parallel to the bottom wall (3) and a second tract (21b) continuous to the first tract (21a) and having a same development as the lateral wall (4).

5. The unit of claim 1, characterised in that the means for supplying (14) the water, in fluid communication with the bath (2), cooperate with the aeration device (5) in order to activate at least three stages of dissolving air, oxygen or ozone in the water.

6. The unit of claim 1, characterised in that the aeration device (5) is located on the bottom wall (3) of the bath (2), facing towards a concavity (11a, 11a') of a curved portion (11, 11'), such that the air flow in exit from the aeration device (5), when impacting against the curved portion (11, 11'), creates a forced recycling of water internally of the turbulent water zone (2a).

7. The unit of claim 6, wherein the bath (2) comprises at least a first wall (9) comprising a curved portion (11, 11') developing in elevation from the bottom wall (3) up to beyond a free surface of the water (8) contained internally of the bath (2), wherein the first wall (9) comprises a straight portion (10), parallel to the bottom wall (3), developing continuously from the curved portion (11) and exhibiting a first end (10a) connected to the curved portion (11), wherein the aeration device (5) is located in the calm water zone (2b), at a second end (10b) of the straight portion (10) of the first wall (9), such that the air flow exiting the aeration device (5) runs above the straight portion (10) before being deviated upwards by the concavity (11a) of the curved portion (11).

8. The unit of claim 2, characterised in that the dividing wall (7) exhibits in section a curved profile with a concavity (7a) facing a concavity (11a, 11a') of the curved portion (11, 11') of the internal wall (9); the dividing wall (7) and the curved portion (11) delimiting the turbulent water zone (2a) on opposite sides thereof with the respective concavities (7a, 11a), internally of which turbulent water zone (2a) a forced recycling of water occurs, the water being activated by the aeration device (5).

9. The unit of claim 1, characterised in that the dividing wall (7), having in section an arched profile, is placed at a free surface (8) of the water, with a convexity (7b) thereof facing towards the calm water zone (2b) in order to convey the foam which forms above the turbulent water zone (2a) above the calm water zone (2b) and with a concavity (7a) facing towards the turbulent water zone (2a) in order to facilitate a descent of a flow of foam-free treated water towards the bottom wall (3) of the bath (2) internally of the turbulent water zone (2a).

10. The unit of claim 3, characterised in that the straight portion (10) of the internal wall (9) defines, with the bottom wall (3) of the bath (2), an outlet path (12) internally of which the water which has been treated and deviated by the dividing wall (7) is conveyed, in order to flow towards the outlet section (13).

11. The unit of claim 4, characterised in that the second wall (21) defines, with the bottom wall (3) and a side of the lateral wall (4) of the bath (2), an exit path (12) inside which the treated water deviated by the dividing wall (7) is conveyed, to flow towards the exit section (13).

12. The unit of claim 1, characterised in that the means for eliminating (6) the foam comprise, above the bath (2), a column (16) along which the foam rises, which foam accumulates above the calm water zone (2b).

13. The unit of claim 12, characterised in that the column (16) internally comprises at least a station (17) for accumulating and eliminating foam.

14. The unit of claim 12, characterised in that the column (16) internally comprises a plurality of stations (17) for accumulating and eliminating foam, piled vertically and reciprocally distanced; each station (17) collecting foam at different foam densities.

15. The unit of claim 13, characterised in that each station (17) for accumulating and eliminating foam comprises a plate (18) having a concavity thereof facing upwards for accumulating foam.

16. The unit of claim 14, characterised in that a maximum transversal size of the plate (18) is smaller than an internal transversal size of the column (16); the plate (18) identifying, with an inside of the column (16), at least a passage hole (20) for enabling the foam to rise.

* * * * *